United States Patent
Finnerty et al.

(10) Patent No.: US 7,498,095 B2
(45) Date of Patent: Mar. 3, 2009

(54) ANODE-SUPPORTED SOLID OXIDE FUEL CELLS USING A CERMET ELECTROLYTE

(75) Inventors: Caine Finnerty, Buffalo, NY (US); David Coimbra, Buffalo, NY (US)

(73) Assignee: NanoDynamics Energy, Inc., Buffalo, NY (US)

( * ) Notice: Subject to any disclaimer, the term of this patent is extended or adjusted under 35 U.S.C. 154(b) by 806 days.

(21) Appl. No.: 10/999,735

(22) Filed: Nov. 30, 2004
(Under 37 CFR 1.47)

(65) Prior Publication Data
US 2005/0181253 A1    Aug. 18, 2005

Related U.S. Application Data

(63) Continuation-in-part of application No. 10/910,026, filed on Aug. 3, 2004, now Pat. No. 6,998,187.

(60) Provisional application No. 60/526,398, filed on Dec. 2, 2003, provisional application No. 60/493,409, filed on Aug. 7, 2003.

(51) Int. Cl.
  *H01M 8/12* (2006.01)
  *C04B 35/64* (2006.01)
(52) U.S. Cl. ............... 429/33; 429/44; 264/618
(58) Field of Classification Search .......... 429/30, 429/31, 32, 33, 44; 264/618
See application file for complete search history.

(56) References Cited

U.S. PATENT DOCUMENTS

| 3,607,323 A | 9/1971 | Tedmon et al. ........... 106/57 |
| 5,035,962 A * | 7/1991 | Jensen ................. 429/33 X |
| 5,108,850 A | 4/1992 | Carlson et al. |
| 5,273,837 A | 12/1993 | Aitken et al. |
| 5,474,800 A | 12/1995 | Matsuzaki |
| 5,916,700 A | 6/1999 | Ruka et al. |
| 5,989,634 A | 11/1999 | Isenburg |

(Continued)

FOREIGN PATENT DOCUMENTS

EP    1 202 369 A1    5/2002

(Continued)

OTHER PUBLICATIONS

Supplementary European Search Report dated Nov. 28, 2008 for European Application No. 04812652.8 (3 pages).

*Primary Examiner*—Stephen J. Kalafut
(74) *Attorney, Agent, or Firm*—K&L Gates LLP

(57) ABSTRACT

Novel solid oxide fuel cell (SOFC) article and method of manufacture with improved properties at lower costs. The structural features and methods involve fabricating an anode (i.e., fuel electrode); applying a cermet electrolyte, which includes a mixture of ceramic and electrochemically active substances, and applying a cathodic layer. The cermet electrolyte containing a small amount of transition metal reduces the thermal expansion mismatch with the anode, and allows for a graded structure of the electrochemically active substances across the anode/electrolyte structure. Under operating conditions, a dense electrolyte and metal oxide sub-layer exist on the oxidized side (cathode side); while the other side of the electrolyte (reducing side) is made of a porous sub-layer containing transition metal. The tailoring of the amounts of metal present in the anode and the cermet electrolyte allows for greater power output and enhanced electrochemical performance, while maintaining the structural integrity and reliability of the SOFC.

38 Claims, 5 Drawing Sheets

U.S. PATENT DOCUMENTS

| | | | |
|---|---|---|---|
| 5,993,985 A | 11/1999 | Borglum | |
| 5,998,056 A | 12/1999 | Divisek et al. | |
| 6,183,609 B1 | 2/2001 | Kawasaki et al. | 204/252 |
| 6,228,521 B1 | 5/2001 | Kim et al. | |
| 6,379,485 B1 | 4/2002 | Borglum | |
| 6,428,920 B1 | 8/2002 | Badding et al. | |
| 6,436,565 B1 | 8/2002 | Song et al. | |
| 6,492,051 B1 * | 12/2002 | Gopalan et al. | 429/31 |
| 6,630,267 B2 | 10/2003 | Badding et al. | |
| 6,692,855 B1 * | 2/2004 | Aizawa et al. | 429/30 |
| 2001/0044043 A1 | 11/2001 | Badding et al. | |
| 2002/0122967 A1 | 9/2002 | Gorina et al. | |
| 2002/0142204 A1 * | 10/2002 | Prediger et al. | 429/32 |
| 2003/0027033 A1 | 2/2003 | Seabaugh et al. | |
| 2004/0023101 A1 | 2/2004 | Jacobson et al. | |
| 2004/0072060 A1 | 4/2004 | Ukai et al. | |
| 2004/0121222 A1 | 6/2004 | Sarkar et al. | |
| 2005/0255355 A1 * | 11/2005 | Ukai et al. | 429/30 |

FOREIGN PATENT DOCUMENTS

| | | |
|---|---|---|
| RU | 2 138 885 C1 | 11/1997 |
| RU | 2 197 039 C2 | 11/2000 |

* cited by examiner

ANODE-SUPPORTED SOLID OXIDE FUEL CELLS USING A CERMET ELECTROLYTE

CROSS-REFERENCE TO RELATED APPLICATION

This application claims the benefit of U.S. Provisional Application No. 60/526,398, filed Dec. 2, 2003 and PCT International Application US04/25233, filed Aug. 5, 2004, and is a Continuation-in-Part of U.S. patent application Ser. No. 10/910,026, filed Aug. 3, 2004 now U.S. Pat. No. 6,998,187, which claims the benefit of U.S. Provisional Application No. 60/493,409, filed Aug. 7, 2003.

FIELD OF THE INVENTION

This invention relates generally to fuel cells, and more specifically, to an anode-supported solid oxide fuel cells or SOFCs, and methods of manufacture, wherein the fuel cells possess enhanced physical properties, including electrochemical properties through application of a novel cermet electrolyte.

BACKGROUND OF THE INVENTION

Several different solid oxide fuel cell structural designs have been developed, including tubular, planar and monolithic designs, all of which are documented in the technical literature (see, for example, Q. M. Nguyen et al., "Science and Technology of Ceramic Fuel Cells", Elsevier Science, January 1995). The tubular SOFC design originated from sealing problems associated with planar fuel cell stacks (see G. Hoogers, "Fuel Cell Technology Handbook", CRC Press, August 2002). A typical tubular SOFC includes a ceramic membrane for conducting oxygen-ions onto which an air electrode (i.e., cathode) and the fuel electrode (i.e., anode) are deposited. Oxygen is converted at the cathode to oxygen ions, which diffuse through the membrane and react with the fuel at the anode. The electrons generated at the anode then migrate through the external load to complete the circuit.

Three types of configurations are typically followed to form the aforementioned structural designs:
  a) Electrolyte-supported, in which a dense electrolyte is used as a support, upon which an anode and a cathode are applied on each side of the layer (see U.S. Pat. No. 5,273,837 to Aitken et al.; and, U.S. Pat. No. 6,428,920 to Badding et al.);
  b) Air electrode-supported (i.e., cathode-supported), in which a porous doped-lanthanum manganite substrate forms a cathode that is coated with a gas-tight electrolyte layer, and subsequently coated with an anode layer (see, for example, U.S. Pat. No. 5,108,850 to Carlson et al.; and, U.S. Pat. No. 5,989,634 to Isenberg); and,
  c) Fuel electrode-supported (i.e., anode-supported), in which a cermet anode support is coated with a thin film electrolyte layer and subsequently coated with a cathode layer (see U.S. Pat. No. 5,998,056 to Divisek et al., and U.S. Pat. No. 6,228,521 to Kim et al.).

In order to obtain high efficiency and/or lower operating temperature, the electrolyte layer in an electrolyte-supported SOFC must be dense, gas tight and very thin (preferably a few microns). Technology for depositing thin electrolyte films onto porous electrode substrates (either the cathode or the anode) is currently under development (see H. P. Buchkremer et al., "Advances in Manufacturing and Operation of Anode Supported SOFC Cells and Stacks", Proceedings of the Third European Solid Oxide Fuel Cell Forum, June 1998, p. 143-149).

Numerous patents have issued to Siemens Westinghouse Power Corp., Orlando, Fla., disclosing the so-called air electrode-supported (AES) technology (see, for example, U.S. Pat. No. 5,916,700 to Ruka, et al.; and, U.S. Pat. No. 5,993,985 to Borglum; and, U.S. Pat. No. 6,379,485 also to Borglum). Notwithstanding noteworthy technical achievements in the field of tubular SOFC, cathode-supported fuel cells suffer from several disadvantages. In particular, cathode materials, such as lanthanum manganite doped with strontium, are very costly. Cathodes are made of ceramic materials and their strength is lower than anodes made of cermets, i.e., composites of ceramic and metal. Typical cathode-supported SOFCs are economically unattractive because they require capital-intensive depositing techniques, such as electrochemical vapor deposition (see U.S. Pat. No. 5,989,634 to Isenberg).

Thus, anode-supported SOFCs are attracting increased attention since they can be fabricated at lower cost while maintaining high mechanical structural strength and providing high power density (see U.S. Pat. No. 6,436,565 to Song et al.). However, existing anode-supported SOFCs still lack superior electrochemical performance and structural reliability. This is mainly due to thermal expansion coefficient mismatch between the anode cermet and the conventional ceramic electrolyte, which can result in cell failure during fabrication, or when under operating conditions.

Accordingly, there is a need for an improved, readily adaptable and economical SOFCs, and methods of manufacture of anode-supported SOFC with superior physical and electrochemical properties, when under operating conditions.

SUMMARY OF THE INVENTION

The present invention broadly relates to solid oxide fuel cells (SOFC), which comprise an internal fuel electrode (anode) serving as a support, an intermediate cermet electrolyte, and an external air electrode (cathode), wherein the cermet electrolyte comprises a minor metal phase dispersed throughout a ceramic material. In one aspect of the invention, the SOFC can also include electrode current collectors.

The anode may be fabricated from a transition metal (e.g., preferably Ni) and a ceramic (e.g., stabilized-zirconia or doped-ceria), a cermet, which may also provide physical support for the entire cell. The electrical conductivity of the anode depends on the metal content. The electrolyte may be made by incorporating a small amount (up to 15 vol %) of a transition metal (either the same metal as used in the anode or another active transition metal) with a ceramic (e.g., stabilized-zirconia, doped-ceria) in the electrolyte, thereby greatly reducing the thermal expansion coefficient mismatch between the anode and the cermet electrolyte layer. This allows for increased metal content (up to 80.0 vol %) in the anode, and thus increased electrical conductivity.

In another aspect of the invention, the metal phase dispersed throughout the anode and the cermet electrolyte may be selected from the transition group of metals of the periodic table of elements, their alloys, and their physical mixtures in elemental or in an uncombined state. Representative examples of useful transition metals include, but are not limited to: Ni, Co, Cu, Ag and W. While nickel is often preferred, precious metals, such as platinum and ruthenium are catalytically active and may also be employed.

If the SOFC is operated at elevated temperatures (700° C. to 1000° C.), then the ceramic electrolyte substance used in the cermet anode and the cermet electrolyte is preferably stabilized-zirconia, e.g., $(ZrO_2)_{0.92}(Y_2O_3)_{0.08}$. If the SOFC is operated at intermediate temperatures (500° C. to 700° C.), then the ceramic electrolyte substance used in the cermet anode and the cermet electrolyte is preferably doped ceria, e.g., $(Ce_{0.90}Gd_{0.10})O_{1.95}$. However, each material can be used over a broad range of temperatures and the selection of the material will depend on design constraints.

The present invention is relevant to typical solid oxide fuel cell structural designs, including tubular, planar and monolith designs. A "monolith" may include virtually any structural configuration that is neither tubular nor planar, as for example, an elongated, flattened tubular shape; a dome of spiral shape, or may also refer to a cell constructed on a third party support material. Thus, the present invention also broadly relates to several structural configurations, including methods of manufacturing anode-supported SOFC using a novel cermet electrolyte. Each of these designs encompasses several preferred manufacturing techniques, which applicability is determined by technical and economic factors. For example, tubular substrates are preferably manufactured via extrusion techniques, whilst planar substrates are preferably fabricated via casting or pressing operations.

Thus, it is yet further object of the present invention to provide methods of manufacturing the improved SOFC with fewer processing steps and lower costs than conventional fuel cell fabrication methods. Particularly significant in this regard is the potential the invention affords for high power density fuel cells prepared at low cost, whilst maintaining mechanical reliability.

One such method of manufacturing an anode-supported SOFC with cermet electrolyte according to the present invention includes the steps of:

(i) forming an anodic slurry into an anodic layer;

(ii) applying a cermet electrolyte slurry onto the anodic layer in a first slurry coating process to create a cermet electrolyte-coated anode;

(iii) applying at least one cathodic slurry onto the cermet electrolyte-coated anode in a second slurry coating process to create a cathodic layer, and (iv) sintering the anodic layer, the cermet electrolyte layer, and the at least one cathodic layer.

In this method of manufacturing, nano-sized particles may be used to create an anode-supported SOFC with the cermet electrolyte. For this embodiment, the metal or the electrolyte substance may be incorporated in the fuel electrode mixture by employing conventional or nano-sized ceramic powders (e.g., stabilized-zirconia, doped-ceria), or both. Furthermore, the nano-sized cermet electrolyte slurry may be aqueous or non-aqueous (i.e., based on organic solvents, preferably alcohols and/or ketones). The step of sintering the fuel electrode, nano-sized cermet electrolyte and air electrodes may be carried out at temperatures ranging from about 1050° C. to about 1300° C., or until the nanoscale cermet electrolyte is fully densified under oxidizing atmosphere.

In a further embodiment of the methods of the invention, the step of sintering the cermet electrolyte-coated anode, after the application of the cermet electrolyte slurry of step (ii), may be performed.

For these methods of manufacturing, the electrolyte substance may also be incorporated in the anode mixture and the cermet electrolyte slurry through use of conventional ceramic powders, stabilized-zirconia, or doped-ceria, for example. The electrochemically active substance can be a metal or a metal oxide. The metal in the electrochemically active substance is preferably incorporated in the fuel electrode mixture and/or the cermet electrolyte slurry through use of a metal oxide powder (subsequently reduced into elemental metal under SOFC operating conditions) according to the protocols of FIG. 3 of the drawings, discussed in further detail below.

Also, the cermet electrolyte slurry may be aqueous or non-aqueous (i.e., based on organic solvents, preferably alcohols and/or ketones). The sintering of the cermet electrolyte-coated fuel electrode may be carried out at temperatures ranging from about 1200° C. to about 1600° C., or until the cermet electrolyte is fully dense under oxidizing atmosphere. Finally, the sintering of the cathodes may be carried out at temperatures in the range of about 1000° C. to about 1200° C.

For any of the methods taught by the present invention, the metal may be partially incorporated in the fuel electrode mixture and/or the cermet electrolyte slurry by means of metal compounds, preferably metal salts, pre-dissolved in aqueous or non-aqueous solvents. Optionally, pore formers (e.g., carbon powder, starch, polymer spheres, and so on) may be introduced into the fuel electrode mixture to tailor the electrode porosity.

In the methods for manufacturing the fuel electrode-supported SOFC with cermet electrolyte, an anode current collector, typically a conductive ink or paste, can be coated onto the fuel electrode cermet support, eliminating the need for metallic physical inserts (for the tubular design). The cathode current collector, also a conductive ink or paste, for instance, may be coated onto the cathode.

According to the invention, the anode supported SOFC may further have a deposited interlayer positioned between the fuel electrode support and the cermet electrolyte. Also, the invention may further comprise a deposited interlayer between the cermet electrolyte and the cathode.

From the forgoing disclosure and the following more detailed description, it will be apparent to those skilled in the art that the present invention provides a significant advance in solid oxide fuel cell technology.

These and other objects, features, and advantages of the present invention will become readily apparent to those of ordinary skill in the art upon reading the following more detailed description of the invention in view of the several drawings of the invention.

BRIEF DESCRIPTION OF THE DRAWINGS

The nature and mode of operation of the present invention will now be more fully described in the following detailed description of the invention taken with the accompanying drawing figures, wherein.

DETAILED DESCRIPTION OF THE INVENTION

It is to be understood that this invention is not limited to the particular methodology, materials and modifications described and as such may, of course, vary. It is also to be understood that the terminology used herein is for purposes of describing particular embodiments only, and is not intended to limit the scope of the present invention, which will be limited only by the appended claims.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

The following terms and expressions as appearing in the specification and appended claims are intended to have the following meaning:

"conventional" or "conventional-sized", and variations thereof, mean solid materials, in dry powder form, having a size distribution whereby >75% of the particles are greater than or equal to 300 nm in size and whereby the specific surface area is lower than 50 $m^2/g$, and "nano-sized" or variations thereof, mean solid materials, in dry powder form, having a size distribution whereby >75% of the particles are less than or equal to 300 nm in size and whereby the specific surface area is greater than about 50 $m^2/g$.

All publications mentioned are incorporated herein by reference for the purpose of describing and disclosing, for example, materials, constructs, and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

Figure 1A:
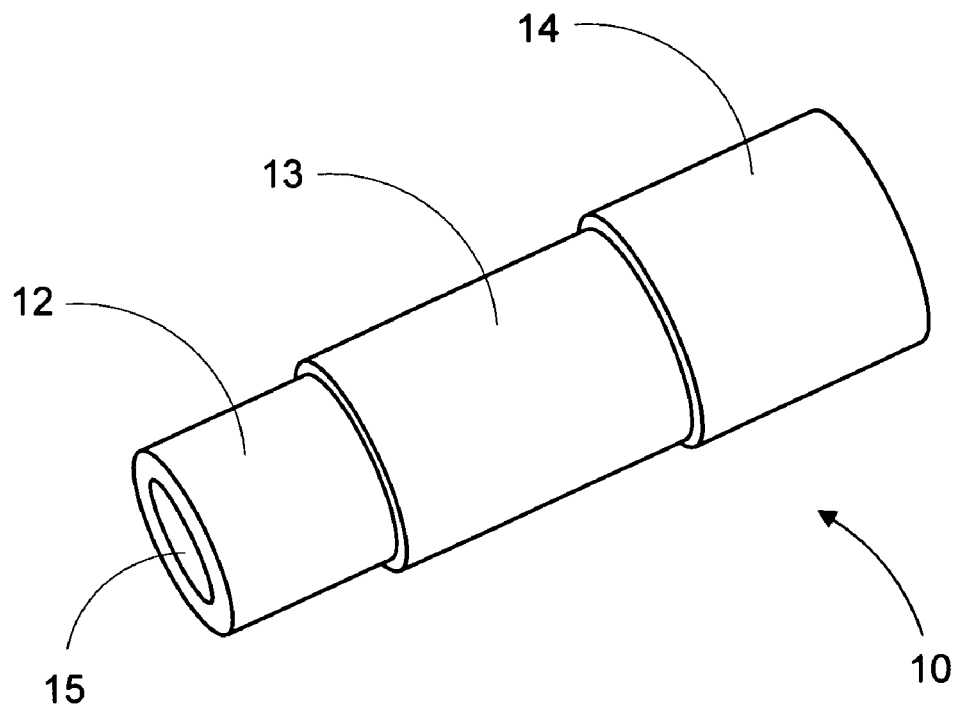
FIG. 1A is an isometric view of a tubular anode-supported SOFC of the invention with portions removed to more readily illustrate the structural features.

Averting now to the figures, FIG. 1A, a general view of tubular anode-supported solid oxide fuel cell (SOFC) 10 of the invention is provided as a cylindrical shaped tubular body modified to best illustrate the internal anodic layer 12, intermediate cermet electrolyte 13 and external cathode 14. Anode 12 defines an inner tubular bore 15.

Figure 1B:
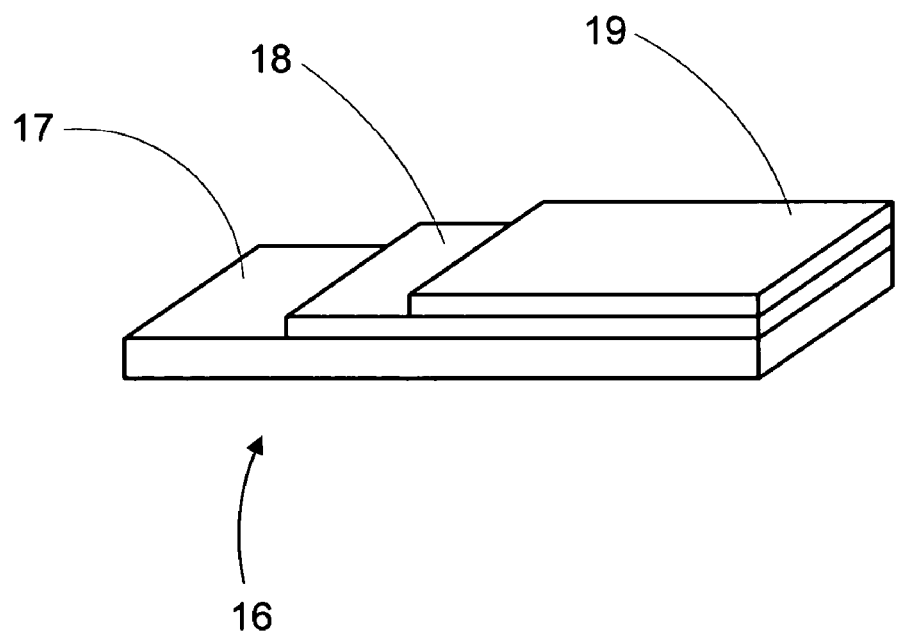
FIG. 1B is an isometric view of a planar anode-supported SOFC of the invention with portions removed to more readily illustrate the structural features.

FIG. 1B, a general view of planar anode-supported SOFC 16 of the invention is provided as a planar shaped flat body modified to best illustrate the internal anodic layer 17, intermediate cermet electrolyte 18 and external cathode 19.

A thick cermet fuel electrode (i.e., anode) provides mechanical reliability and durability, while a cermet electrolyte allows for better thermal expansion matching and electrochemical performance. The use of the anode as the support structure in the fuel cell is most beneficial from the standpoint of performance, as well as for processing. With anodes of thickness on the order of about 0.2 to about 1.0 mm, it is possible to achieve high power densities through increased electrical conductivity and reduction of activation overpotential (i.e., voltage losses due to electrochemical charge transfer reactions). Thinner substrates would be impractical since the support would be too fragile and electrical conductivity would be insufficient.

The content of the electrochemically active substance in the cermet is preferably metal. When used in the anode, the metal content is preferably in the range of about 30 vol % through 80 vol %, based on the total solids loading. When the metal content is less than 30 vol %, the cermet anode has poor electrical conductivity. When the metal content of the cermet anode is greater than 30 vol %, a good interfacial bonding is brought about among the metal particles, resulting in an increase in electrical conductivity.

In order to enhance cell performance, the porosity of the anode may be increased, so that concentration polarization (i.e., voltage losses associated with resistance to gas flow through porous electrodes) is kept at a minimum level. The reduction of metal oxide powders into metal under a reducing atmosphere allows for porosity to be created in the anode substrate, thus the need for higher contents of metal oxide in the fuel electrode mixture. Additional porosity can be created via the use of artificial pore formers (e.g., carbon powder, starch, polymer spheres), subsequently burned out during sintering. Maximum amounts of pore-forming agents are fixed at about 50 vol %, based on the total solids loading, since higher ratios can lead to poor mechanical strength. Thus, metal contents of the cermet anode, up to about 80 vol % were found to be adequate to ensure very high electrical conductivity whilst maintaining sufficient porosity to minimize concentration polarization. Higher amounts of metal in the cermet anode can result in a large thermal expansion coefficient mismatch with the coated cermet electrolyte, resulting in cracks developing during processing or cell operation. The ceramic material of the cermet anode is discussed in detail below.

Excessive thermal expansion coefficient mismatch between the anode support and a typical ceramic (i.e., 100% ceramic) electrolyte generally exist when the metal content in the anode is too high. This detrimental effect is usually avoided by limiting the amount of metal present in the anode to, for example, approximately 50 vol % (see U.S. Pat. No. 6,436,565 to Song et al.), or by using a graded anode structure (see U.S. Pat. No. 6,228,521 to Kim et al.). The present invention allows for large amounts of metal to be included in the anode, specifically, greater than 50 vol %. The application of a thin electrolyte layer onto a single-layered anode-supported SOFC is also more viable from a processing standpoint.

When metal is incorporated in the electrolyte structure at relatively small amounts, about 0.1 vol % to 15.0 vol %, it is possible to greatly reduce the thermal expansion coefficient mismatch between the anode and the electrolyte. Therefore, a thin cermet electrolyte can be layered onto a highly conductive supported anode without detrimental effects on the structural integrity of the cell.

Providing that the amount of metal incorporated in the electrolyte remains sufficiently small, and the metal phase is well-dispersed in the ceramic matrix, electrical conductivity in the electrolyte will remain sufficiently low to avoid electrical shorting. Under normal SOFC operating conditions, metal contained in the electrolyte exists in its elemental (reduced) form on the fuel side; whilst the presence of air on the cathode side maintains the metal in its metal oxide (oxidized) form (see FIG. 2). The thickness of these metal: ceramic and metal oxide: ceramic sub-layers are dependent upon the partial pressures of the fuel and oxidant (air). The metal oxide: ceramic electrolyte sub-layer must be dense and gas-tight in order to prevent mixing of the fuel and oxidant gases.

Under operating conditions, metal present in the reduced electrolyte sub-layer creates a graded anode structure within the anode, which limits anode/electrolyte interfacial resistance and improves adhesion between these layers. Electrochemical performance is also enhanced through increased three-phase boundary area. On the other hand, metal oxide present in the oxidized electrolyte sub-layer creates a very thin and dense electrolyte structure required for high efficiency and lower operating temperatures. The aforementioned behavior is described in greater detail in view of FIG. 2.

Figure 2:
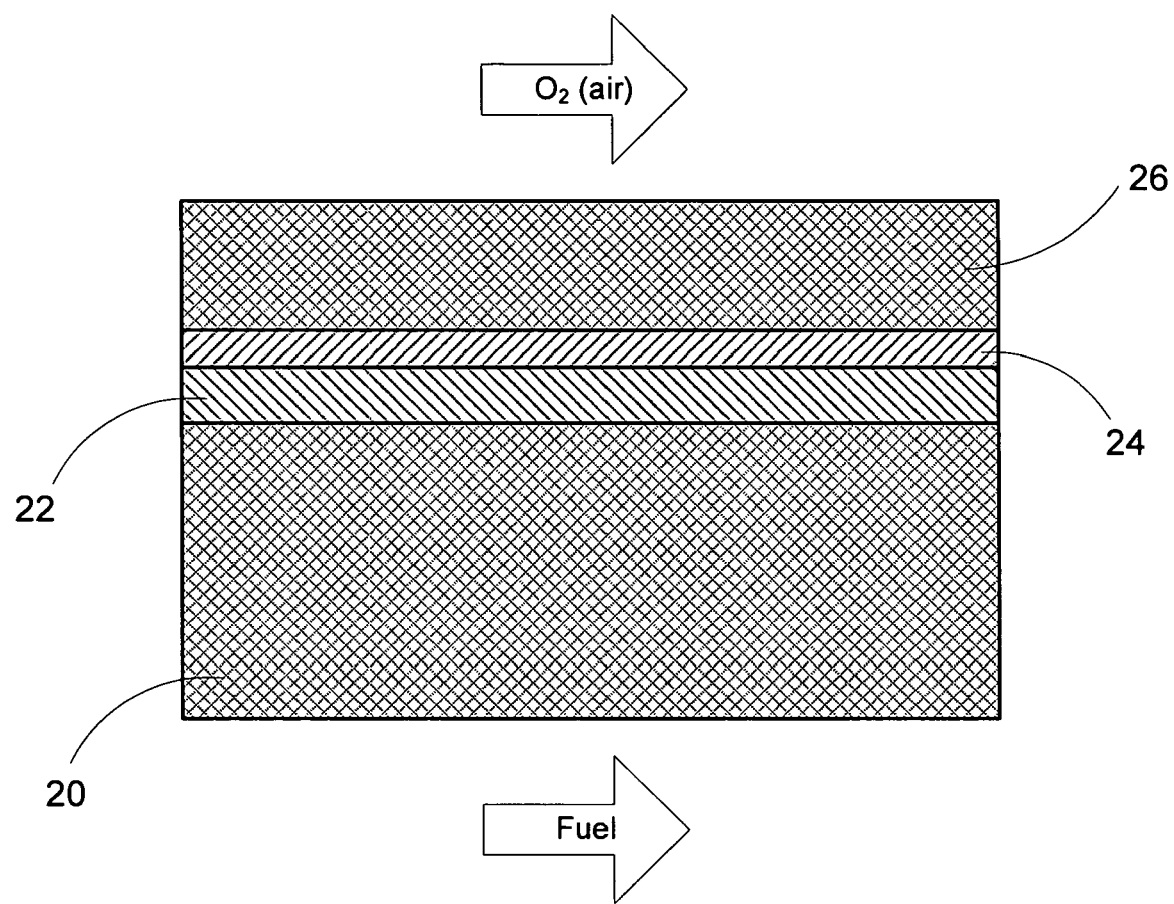
FIG. 2 is a cross-sectional view of a SOFC of the invention illustrating the sub-layers under operating conditions.

FIG. 2 generally shows supporting anode layer 20, "porous" cermet electrolyte layer 22, dense cermet electrolyte layer 24 and cathode layer 26. Under SOFC operating conditions, metal is oxidized (e.g., NiO) in dense cermet electrolyte layer 24, while metal is reduced (e.g., Ni) in "porous" cermet electrolyte layer 22. Enhanced electrochemical performance results from the existence of electrolyte sub-layers, specifically the metal: ceramic and metal oxide: ceramic layers. The reduced metal: ceramic sub-layer, i.e., "porous" cermet electrolyte layer 22, effectively becomes the electrolyte/anode interface. Activation polarization is then reduced, since this interface contains a large amount of ceramic substance.

Electrochemical reactions are also enhanced through increased three-phase boundary domain. Depending on the partial pressures of the fuel and oxidant, the metal oxide: ceramic sub-layer, i.e., dense cermet electrolyte layer 24, can become very thin (less than 10 microns). Providing that the metal oxide phase is sufficiently low (<15 vol %) and well-dispersed in the ceramic matrix, it is possible to achieve a dense, thin, and gas-tight metal oxide: ceramic structure. The ionic conductivity of the cermet electrolyte depends directly on the dispersion state and the electrochemical activity of the metal oxide phase. By decreasing the thickness of dense cermet electrolyte layer 24 under operating conditions (through reduction of the metal oxide on the fuel side), the electrolyte electrical resistance is also lowered. Therefore, if any losses in ionic conductivity through dense cermet electrolyte layer 24 occur due to the presence of a non-ionic or mixed ionic conductive secondary phase (e.g., metal oxide), this is compensated by minimized electrical resistance losses.

Figure 3:
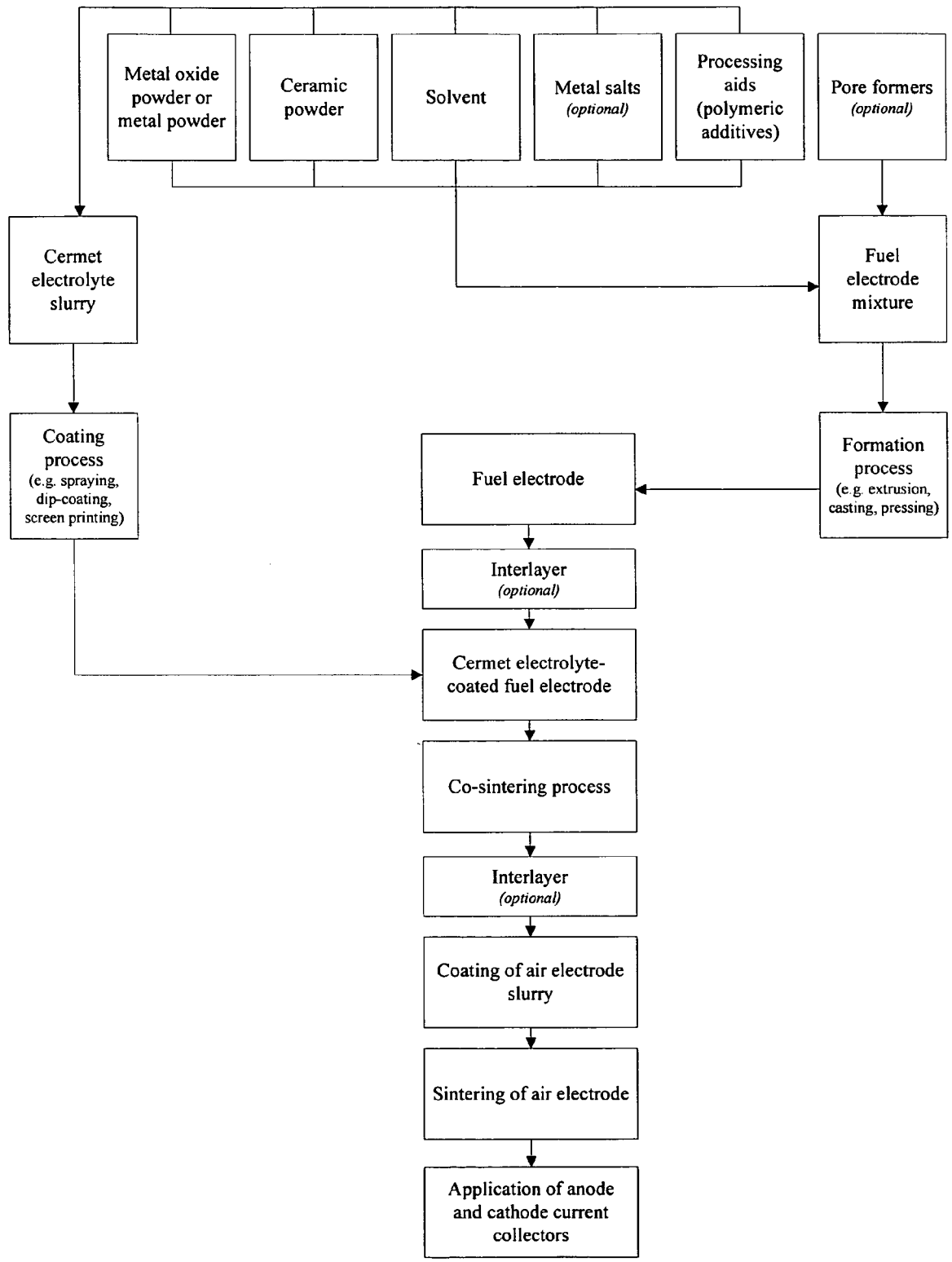
FIG. 3 is a block diagram illustrating a sequence of steps in manufacturing an anode-supported SOFC according to methods of the invention with cermet electrolyte, using conventional-sized precursors.
Figure 4:
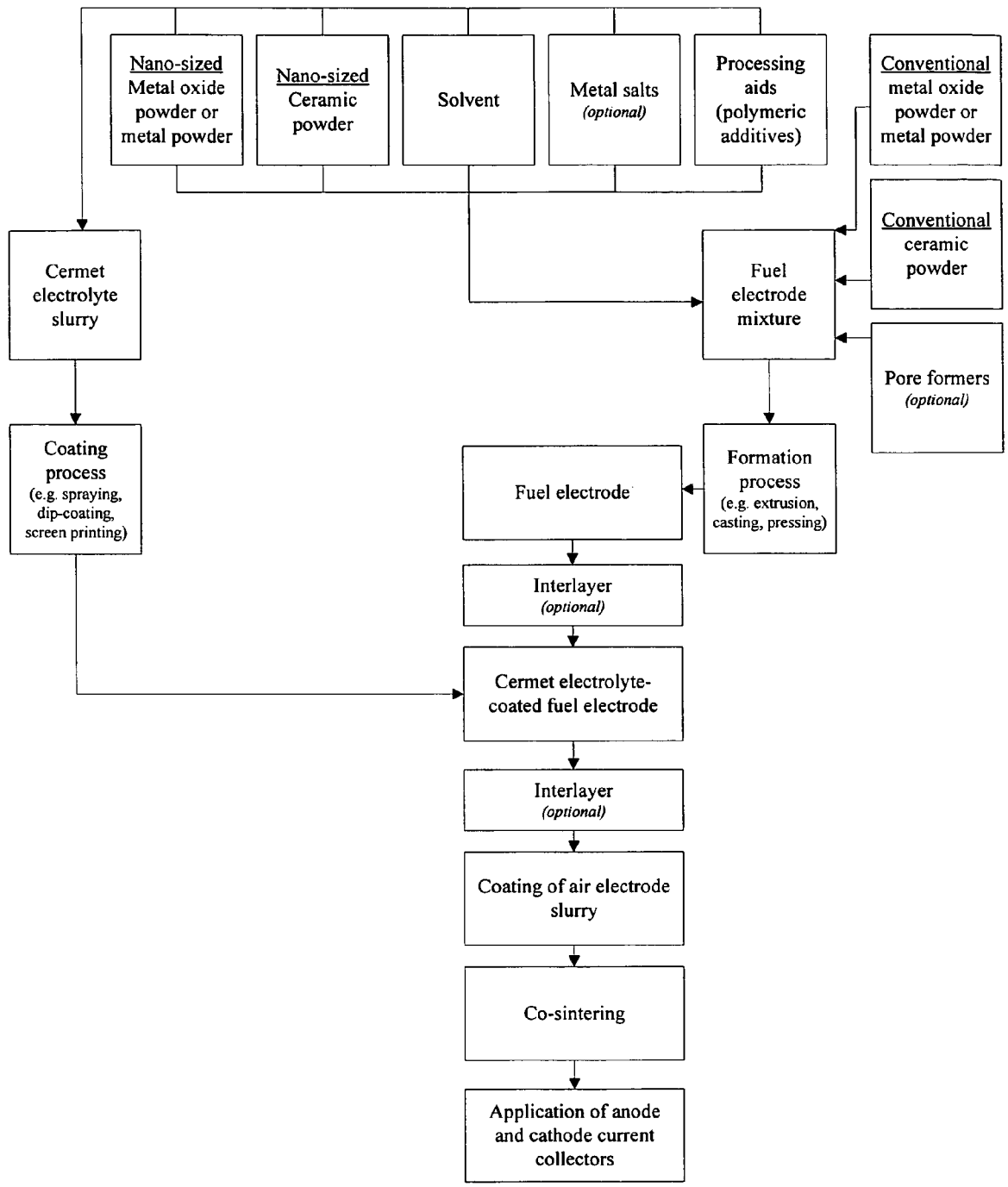
FIG. 4 is a block diagram illustrating a sequence of steps in manufacturing an anode-supported SOFC with cermet electrolyte according to the invention, using nano-sized precursors.

FIGS. 3 and 4 disclose processing block diagrams when "conventional-sized" and "nano-sized" powders are used, respectively. Nickel-based materials and 8 mol % yttria-stabilized-zirconia are used to illustrate the processing stages, but, as mentioned above, other transition metals and ceramic materials known to those skilled in the art, may be used.

Figure 5:
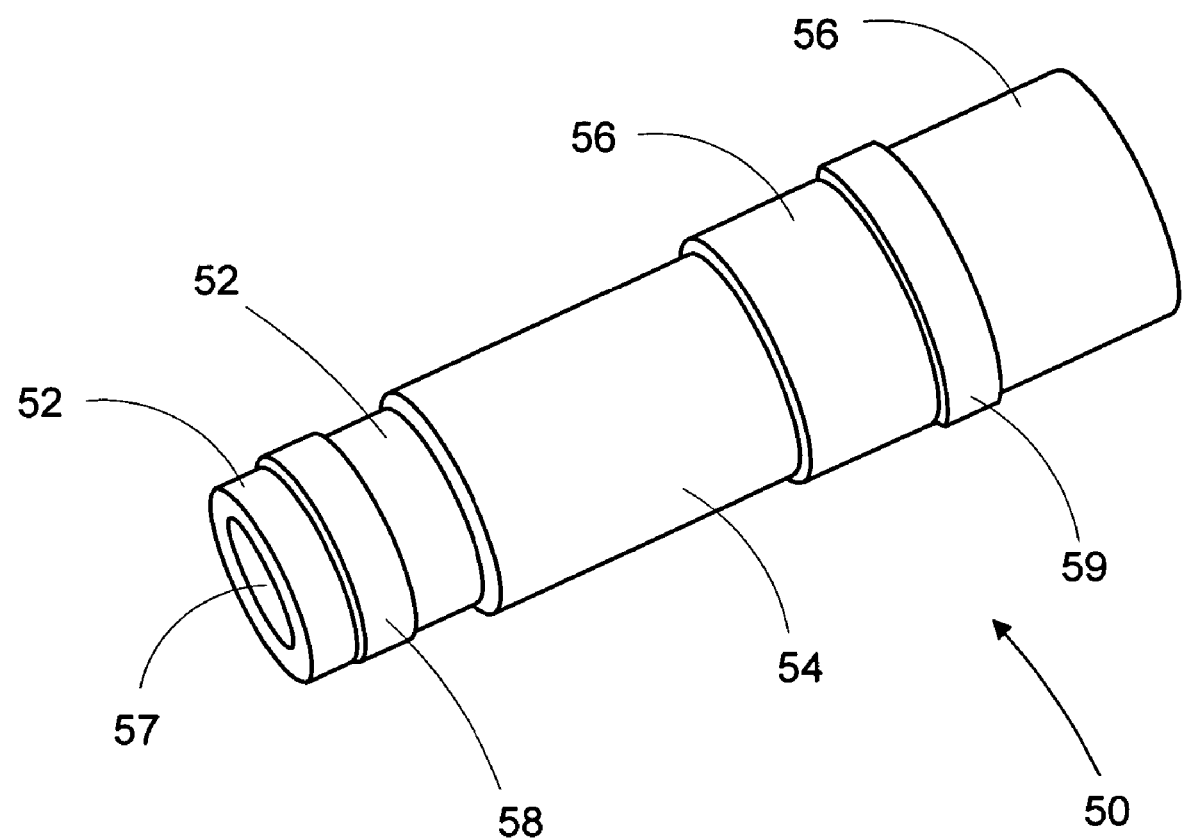
FIG. 5 is an isometric view of a current collection design (for anode and cathode) adapted to a tubular anode-supported SOFC with portions removed to more readily illustrate the structural features of the invention.

The processing routes shown in FIGS. 4 and 5 rely on preparing an anode mixture, containing metal and ceramic compounds. Aqueous or non-aqueous media may be used to suspend the particulates. However, aqueous media are often preferred because of their cost effectiveness and the environmental concerns related to the flammability and toxicity of organic solvents. Common processing additives (dispersants, binders, plasticizers) are also used to ensure a well-dispersed, homogeneous and stable mixture (see R. J. Pugh et al., "Surface and Colloid Chemistry in Advanced Ceramics Processing", Marcel Dekker, October 1993). The characteristics of these mixtures, such as viscosity, can be altered by changing the properties or the amounts of the different raw materials. They are then adapted to specific molding procedures.

The ceramic material used in the fuel electrode support and the electrolyte may be stabilized-zirconia, preferably used for high-temperature SOFC (700° C. to 1000° C.). This includes preferably 8 mol % yttria-stabilized zirconia ("Y8SZ"), $(ZrO_2)_{0.92}(Y_2O_3)_{0.08}$. Another material of interest is doped-ceria, preferably used for intermediate temperature SOFC (500° C. to 700° C.). This includes preferably gadolinium-doped ceria ("CGO"), $(Ce_{0.90}Gd_{0.10})O_{1.95}$. However, each of these materials may be employed over a wide range of temperatures. Of course, it is contemplated that other materials suitable for SOFC electrolyte applications known to those of skill in the art may be used.

The metal phase used in the cermet fuel electrode (anode) and the cermet electrolyte belongs, preferably, to the transition group of metals of the periodic table of elements, their alloys or physical mixtures. Nickel (Ni) is preferred, because of its high electrical conductivity under reducing atmosphere and its cost effectiveness. Metal may be introduced in the supported fuel electrode and cermet electrolyte via different precursors, known to those skilled in the art such as metal powders, metal oxide powders, and metal salts (aqueous or non-aqueous). Metal oxide powders, such as green NiO, are often preferred because of their cost effectiveness and their adaptability to ceramic processing. The use of fine metal oxide powders is particularly recommended for the cermet electrolyte processing since the metal will remain oxidized under SOFC operating conditions.

The metal phase range may vary from about 30 vol % to 80 vol % in the cermet anode. The thickness in the sintered state of the cermet anode will depend on the overall design of the fuel cell. For example, anode thickness in small diameter tubular fuel cells may range from about 0.2 mm to about 1.0 mm.

The metal phase range may vary from about 0.1 vol % to about 15 vol % in the cermet electrolyte. The thickness of the cermet electrolyte in the sintered state is preferably kept below 500 microns, preferably below 100 microns, more preferably below 50 microns in thickness, and most preferably 5-30 microns in thickness. The actual thickness will depend in part on the size and design of the fuel cell.

The use of a thick anode support allows for very thin subsequent electrolyte and cathode coatings. The reduced thickness of the electrolyte and cathode coatings offers enhanced thermal shock resistance and electrochemical performance. The substantial increase in cell performance and stability also enables the cell to operate at lower temperatures. This, in turn, enables cost-effective materials (e.g., stainless steel) to be used within the stack (e.g., for cell manifolding).

The processes described above also allow for depositing thin interlayers between the electrode and the electrolyte structures, without affecting the number of sintering cycles. There are potential advantages in applying interlayer thin films between the anode and the electrolyte, the electrolyte and the cathode, or both. The purpose of such layers may be to increase cell performance, e.g., through the use of catalytic materials, or to prevent adverse chemical reactions during sintering. These interlayers are optional in the present invention, as shown in both FIGS. 3 and 4. The interlayer may be comprised of catalysts. Representative examples include CGO, i.e., ceria gadolinium oxide, as previously disclosed, used in a range from about 40 to 60 Vol %, together with the balance being Ni and Ru. Others may include strontium stabilized zirconia, i.e., SSZ, used with Ni and Ru. The interlayers may also contain other catalytically active metals, like Pt, Pd and Rh, to name but a few.

The geometry of the anode support may be tubular open both ends, tubular closed at one end, planar, or other configurations known in the art. In particular, extrusion of plastic masses is preferred for manufacturing tubular shapes (open at both ends or closed at one end). The co-pending U.S. patent application Ser. No. 10/910,026, filed Aug. 3, 2004, for "SOLID OXIDE FUEL CELLS WITH NOVEL INTERNAL GEOMETRY", provides examples of variations on manufacturing tubular shapes and is incorporated by reference herein in its entirety.

On the other hand, planar shapes are preferably molded using casting techniques (i.e., liquid processing) or pressing techniques (i.e., dry processing). Casting techniques include slip-casting, centrifugal casting, gel-casting, tape casting, and the like. Pressing techniques include dry pressing and isostatic pressing. All these processing routes are documented in the literature (see, for example, J. S. Reed, "Principles of Ceramic Processing, $2^{nd}$ Edition", J. Wiley & Sons, November 1994), the contents of which are incorporated by reference.

In any shape, the anode mixture may be a plastic mass molded by extrusion techniques. The anode mixture may be an aqueous or non-aqueous slurry molded by casting techniques, preferably slip-casting, centrifugal-casting, gel-casting, and tape-casting. Also, the anode mixture may be a dry blend molded by pressing techniques, preferably dry-pressing and isostatic pressing.

Further improvement to the electrochemical properties of the fuel cell may be brought about by introducing other additives, specifically artificial pore formers in the electrode layers (either the anode, the cathode or both) in order to tailor the porosity of the electrodes and to optimize their catalytic activity.

Turning now to the cermet electrolyte, an aqueous or non-aqueous cermet electrolyte slurry containing a small amount of the transition metal compound is applied to the unsintered shaped anode support (tubular or planar). The supported anode may be partially sintered prior to electrolyte coating, but this is optional. Typical slurry coating techniques known to those skilled in the art, may be used. This includes, but is not limited to, spraying, dip-coating, screen printing, pad printing, painting, transferring, and the like. The suitability of the coating technique depends on the shape of the fuel electrode substrate and the thickness of the coated layer. A thin, uniform and well-bonded structure is required to ensure maximum performance and minimum resistance losses.

Similar techniques can be used to apply a thin interface layer (<20 microns) prior to layering the cermet electrolyte coating (onto the unsintered anode support). However, this is an optional step.

In one embodiment, a method for manufacturing the anode supported SOFC using the cermet electrode relies on using conventional ceramic powders, conventional metal and/or metal oxide powders, and other metal compounds, including metal salts. By reducing the thermal expansion coefficient mismatch between the anode support and the cermet electrolyte coating, sintering of these two layers (until complete densification of the electrolyte layer) can be achieved without any detrimental damage to the structural integrity of the fuel cell. This is in contrast with established fuel cell processing methods whereby the electrode substrate is partially sintered or pre-sintered before the electrolyte coating is applied (see U.S. Pat. No. 6,436,565 to Song et al.). The subsequent firing of the cathode layers (<1200° C.) allows for two sintering cycles only.

If "conventional" type powders are used in the manufacturing process, such as illustrated by FIG. 3, the cermet electrolyte-coated anode is sintered at relatively high temperatures, ranging from about 1200° C. to about 1600° C., in order to achieve full densification of the cermet electrolyte coating under an oxidizing atmosphere.

An "air electrode slurry", i.e., cathode slurry, containing a mixture of cathode material and ceramic electrolyte material is then applied onto the gas-tight cermet electrolyte coating using conventional slurry coating processes. A second air electrode containing a single-phase cathode material is then applied onto the dry primary cathode coating. The use of a dual cathode structure allows for better thermal expansion coefficient matching with the electrolyte, and enhanced electrochemical properties. Preferred cathode materials belong to the following group of perovskites: $LaSrMnO_3$, $LaSnFeO_3$, $(LaSr)(CoFe)O_3$, $LaCaMnO_3$ and $(LaCa)(CoFe)O_3$. Air electrode coatings are then generally sintered at relatively low temperatures, typically less than 1200° C. Lower temperature sintering is used since the chemical reactivity at the cathode/electrolyte interface usually increases at higher temperatures, which in turn results in the potential formation of resistive secondary phases (see P. J. Gellings et al., "The CRC Handbook of Solid State Electrochemistry", CRC Press, December 1996). The use of an interlayer between the electrolyte and the first cathode may help to prevent the formation of such resistive compounds at high temperatures, however in this embodiment the interlayer is optional.

Another embodiment describes a method for manufacturing the anode supported SOFC using the cermet electrolyte that relies on using "nano-sized" ceramic powders, "nano-sized" metal and/or metal oxide powders, and other metal compounds, including metal salts. Nano-sized powders have an advantage over conventional ceramic powders in that their high surface area allows them to be densified at relatively low sintering temperatures. Therefore, the use of nano-sized ceramic and metal powders can significantly reduce the complete densification of the cermet electrolyte. In this embodiment, the cathodes can be applied on the unsintered electrolyte coating, and the entire cell (i.e., anode support, cermet electrolyte and cathodes) can be co-sintered in a single cycle, at temperatures below 1200° C.

FIG. 4 shows nano-sized metal and ceramic powders being used in a manufacturing process of the invention, for anode and cermet electrolyte fabrication (described supra). The incorporation of nano-sized powders in the cermet electrolyte enables significantly lower sintering temperature. Very high surface area (e.g., >100 $m^2$/g) metal oxide (e.g., green NiO) and ceramic (e.g., Y8SZ) powders can reduce the sintering temperature of the cermet electrolyte to below 1200° C. Therefore, it becomes possible to apply the cathode layers (as described supra) onto the unsintered cermet electrolyte-coated anode, and sinter the multiple layers at temperatures below 1200° C., so that the electrolyte may become fully dense. The use of nano-sized powders is optional in the manufacturing of the supported fuel electrode, and can also be partially incorporated along with "conventional" powders. The optional nano-sized materials aid in minimizing manufacturing costs, whilst electrical conductivity and mechanical stability are optimized. Hence, single stage sintering in the fabrication the anode-supported SOFC of this invention provide a significant technological advance compared to the traditional multi or three sintering stages required in most SOFC manufacturing processes.

In the embodiments described in FIGS. 3 and 4, after the anode, electrolyte and cathode layers have been sintered, current collectors can be applied to complete fuel cell manufacturing. Highly conductive inks or pastes, preferably containing silver, are often used for this effect.

FIG. 5, a general view of tubular anode-supported solid oxide fuel cell (SOFC) 50 of the invention is provided as a cylindrical shaped tubular body modified to best illustrate the internal anodic layer 52, intermediate cermet electrolyte 54 and external cathode 56. Anode 52 defines an inner bore 57. Also shown in this embodiment are screen printed anode and cathode current collectors 58 and 59, respectively.

In a typical tubular design, anode current collection generally relies on using metallic inserts (not shown). The high electrical conductivity of metallic inserts allows the transfer of electrons from the anode through multiple physical contact points. However, the main disadvantage of this technique is the problem of maintaining good physical contact between the metal inserts and the anode coating, under reducing atmosphere and over extended periods of time. Generally, physical contact is lost over time, due to instability of the metallic inserts under operating conditions. In contrast, the use of a highly conductive metal-rich supported anode allows for conductive ink or paste to be applied directly onto the fuel electrode, without the use of any physical inserts into the tube (see FIG. 5). This in turn is favorable to the electrochemical performance of the cell, since fuel feeding is not hindered by physical obstacles, and fuel is distributed more uniformly to the anode reaction sites.

Likewise, the use of a highly conductive cermet anode support is also beneficial for simplifying the anode current collection design. Typically in the tubular design, physical metallic inserts are used for drawing the electrons from the anode under operating conditions. However, these metallic inserts are prone to dimensional instability at operating temperatures, and the efficiency of the current collector is lowered if good physical contact is not maintained. The use of stable conductive inks or pastes applied directly onto the highly conductive fuel electrode is therefore preferred.

The following examples are presented for the purposes of description and illustration. They are not to be considered to be limiting in any way. Variations, permutations, and combinations on the numerous aspects of the present invention are also intended to be within the spirit and scope of the invention as claimed.

EXAMPLE 1

Fabrication of a Tubular Fuel Electrode Support by Extrusion

Tubular fuel electrode supports are preferably molded via extrusion of pastes, i.e., plastic masses (see J. Benbow et al., "Paste Flow and Extrusion", Clarendon Press, January 1993).

A green oxide, NiO powder, is mixed with a Y8SZ powder, so that following reduction of NiO, the amount of Ni introduced in the mixture ranges from 30 to 80 vol %. The paste composition further includes distilled water (carrier), methylcellulose or hydroxypropyl methylcellulose (binder), and glycerol or polyethylene glycol (plasticizer). Appropriate paste compositions can include 70 to 90 wt % solids loading (NiO+Y8SZ), 5 to 25 wt % water, 1 to 15 wt % binder, and 0.1 to 5 wt % plasticizer. The composition is then mixed under conditions of high shear, using a high-shear mixer, such as a sigma-blade mixer, so that a homogeneous plastic mass is formed.

Optional additives include pore formers (e.g., carbon powder, starch, and polymer beads) and a solution of $Ni(NO_3)_2$ pre-dissolved in water (up to 15 wt %).

The anode tube may then be extruded by forcing the paste through a die at elevated pressure (e.g., 1 to 50 kN). The shape of the die determines the cross-sectional geometry of the extruded tubes. For example, tubes having an outer diameter of 5 mm and an inner diameter of 4 mm have successfully been extruded and tested for electrochemical performance.

Extruded tubes may be dried in ambient air over a few hours. Shorter drying times are achieved by using a temperature/humidity chamber where the humidity is controlled. The humidity is gradually decreased from high starting settings, 90 to 100% RH, until the tube is fully dry.

EXAMPLE 2

Preparation and Coating/Sintering of Cermet Electrolyte

The cermet electrolyte slurry is a multi-component system, containing in particular a solvent (20 to 60 wt %), an inorganic phase (40 to 80 wt %), a dispersing agent (0.1 to 3 wt %), a binding agent (1 to 15 wt %), and a plasticizing agent (1 to 15 wt %).

The solvent allows the powders to be dispersed and ensures that the organic components are dissolved. Water is the preferred medium, but easier processing is often achieved by using organic media, such as alcohols and ketones.

The inorganic phase is made of a primary Y8SZ phase and a secondary green NiO phase, so that, following reduction of NiO, the amount of Ni introduced in the mixture ranges from 0.1-15.0 vol %. The properties required from an ideally sinterable powder to produce a theoretically dense coating are a fine particle size (i.e., 0.1 to 1.0 micron), a narrow particle size distribution, an equiaxed shape, and a non-agglomerated state.

The dispersing agent (dispersant) is necessary to obtain good, stable de-agglomeration and dispersion of the Y8SZ and NiO particles in the solvent, and to stabilize the suspension with a high solids: organic ratio. Commercial dispersants are readily available and should be tested for efficiency in the required solvent. For example, "KD2" (from ICI) was proven to be an effective dispersant for Y8SZ and NiO in acetone.

The binding agent (binder) is added to the slurry in order to enhance the strength of the unsintered coating. The binder forms organic bridges, resulting in strong adhesion after evaporation of solvent. Polyvinyl alcohol (PVA) and polyvinyl butyral (PVB) are examples of suitable binders for water-based slurries and organic media-based slurries, respectively. Additional suitable binders known to those skilled in the art may also be used.

A plasticizing agent (plasticizer) is added to the slurry to reduce the glass transition of the binder and for ease of handling and storage. The invention contemplates, but is not limited to common plasticizers for PVA, such as polyethylene glycol, glycerol and atmospheric water. Similarly, common plasticizers for PVB include, but are not limited to, dibutyl phthalate (DBP) and polyethylene glycol (PEG).

Other optional additives, such as conventional homogenizers and anti-foaming agents, may be optionally added as necessary.

A particularly effective method for dispersing the ceramic and metal oxide powder in the solvent is milling and mixing. This breaks down the naturally occurring agglomerates in the starting powder and promotes the adsorption of dispersant. The most common milling method is ball-milling, but more aggressive milling techniques, for example vibratory milling, are preferred to ensure more effective de-agglomeration of the powders. This requires the use of grinding media, preferably stabilized-zirconia beads.

The sequence of addition of organic additives is important because of the competing adsorption of the different organic additives onto the powders. Thus, slurry processing is performed in two stages. Firstly, the powders are immersed in the solvent, and the dispersant is mixed in, for up to 24 hours. When a homogeneous mixture is obtained and the particles are appropriately dispersed, the binder and plasticizer are added for a second milling/mixing step, again for up to 24 hours. The dispersant is added before the other organic compounds to prevent competitive adsorption onto the particle surface.

Once a concentrated and stable suspension is obtained, anode support tubes can be dip-coated in the cermet electrolyte slurry. The thickness of the coating is directly dependent upon the viscosity of the slurry. Thin layers are obtained when very low viscosity slurries are used, typically <50 mPa-s.

After drying, the cermet electrolyte-coated anode support is sintered between 1200° C. and 1600° C., or until the cermet electrolyte is fully dense. The heating rate from room temperature up to 600° C. should be kept relatively low (e.g., <2° C./min) to avoid any failure in the final product due to a non-homogeneous burn out of the organic compounds. Once the sintering temperature is reached, and the temperature maintained, the dwell time is preferably between 0.5 and 4.0 hours.

EXAMPLE 3

Preparation and Coating of Air Electrodes

Cathode mixtures are prepared in the same manner as the one described for the cermet electrolyte slurry of Example 2. The first cathode layer is a mixture of cathode material (e.g., 50 wt %) and Y8SZ (e.g., 50 wt %). The preferred cathode materials are $La_{1-x}Sr_xMnO_3$ and $La_{1-x}Sn_xFeO_3$, wherein x is between 0.1 and 0.5. The second electrode is a single-phase cathode material, used for enhanced electrical conductivity, typically consisting of the aforementioned preferred cathode materials.

Air electrodes can be painted or sprayed, for example using an airbrush, however, other methods know in the art are equally suitable. After drying, they are sintered at relatively low temperatures, typically below 1200° C., with a dwell time preferably between 0.5 and 4.0 hours.

Although the invention has been described in detail for the purpose of illustration, it is understood that such detail is solely for that purpose, and variations can be made therein by those skilled in the art without departing from the spirit and scope of the invention which is defined in the claims.

What is claimed is:

1. A solid oxide fuel cell comprising:
   an anodic layer,
   at least one cathodic layer, and
   a gas-tight electrolytic layer disposed between the anodic layer and the at least one cathodic layer, wherein the electrolytic layer comprises an electrolytic cermet comprising a ceramic phase and a metallic phase dispersed within the ceramic phase, the metallic phase comprising between about 0.1 vol % and about 15 vol % of the electrolytic layer and comprising at least one transition metal.

2. The solid oxide fuel cell of claim 1, wherein the ceramic phase of the electrolytic cermet comprises a ceramic material selected from stabilized-zirconia, a doped ceria and mixtures thereof.

3. The solid oxide fuel cell of claim 2, wherein the stabilized-zirconia is $(ZrO_2)_{0.92}(Y_2O_3)_{0.08}$ and the doped ceria is $(Ce_{0.90}Gd_{0.10})O_{1.95}$.

4. The solid oxide fuel cell of claim 1, wherein the at least one transition metal is selected from Ni, Co, Cu, Ag, W, Pt and Ru.

5. The solid oxide fuel cell of claim 2, wherein the electrolytic layer in a sintered state comprises a thickness below about 0.1 mm.

6. The solid oxide fuel cell of claim 1, wherein the anodic layer comprises an anodic cermet comprising a ceramic material selected from a stabilized-zirconia, a doped ceria and mixtures thereof, and a metallic phase comprising at least one transition metal.

7. The solid oxide fuel cell of claim 6, wherein the stabilized-zirconia is $(ZrO_2)_{0.92}(Y_2O_3)_{0.08}$ and the doped ceria is $(Ce_{0.90}Gd_{0.10})O_{1.95}$.

8. The solid oxide fuel cell of claim 6, wherein the metallic phase of the anodic cermet comprises a transition metal selected from Ni, Co, Cu, Ag and W.

9. The solid oxide fuel cell of claim 6, wherein the metallic phase of the anodic cermet comprises between about 30 vol % and about 80 vol % of the anodic layer.

10. The solid oxide fuel cell of claim 6, wherein the anodic layer in a sintered state comprises a thickness between about 0.2 mm and about 1.0 mm.

11. The solid oxide fuel cell of claim 1, wherein the at least one cathodic layer comprises a primary cathodic layer comprising a first cathodic material and a cathodic ceramic material selected from a stabilized-zirconia, a doped ceria and mixtures thereof, and a secondary cathodic layer comprising a second cathodic material.

12. The solid oxide fuel cell of claim 11, wherein the stabilized-zirconia is $(ZrO_2)_{0.92}(Y_2O_3)_{0.08}$ and the doped ceria is $(Ce_{0.90}Gd_{0.10})O_{1.95}$.

13. The solid oxide fuel cell of claim 11, wherein the first and second cathodic materials are independently selected from $La_{1-x}Sr_xMnO_3$ and $La_{1-x}Sn_xFeO_3$, wherein x ranges from 0.1 to 0.5.

14. The solid oxide fuel cell of claim 1, wherein at least one of the anodic layer and the cathodic layer comprises a fuel cell performance enhancing interlayer disposed adjacent the electrolytic layer.

15. The solid oxide fuel cell of claim 14, wherein the performance enhancing interlayer comprises a catalytic material.

16. The solid oxide fuel cell of claim 1 comprising a structural configuration which is tubular and open at both ends, tubular and open at one end, planar or monolith.

17. A fuel cell stack comprising a plurality of the solid oxide fuel cells of claim 1.

18. The solid oxide fuel cell of claim 6, wherein the metallic phase of the electrolytic layer comprises a transition metal that is present in the metallic phase of the anodic layer.

19. The solid oxide fuel cell of claim 18, wherein the transition metal is Ni.

20. A method for manufacturing a solid oxide fuel cell, the method comprising:
   forming an anodic slurry into an anodic layer;
   applying a cermet electrolyte slurry onto the anodic layer in a first slurry coating process to provide a cermet electrolyte-coated anodic layer, wherein the cermet electrolyte slurry comprises a ceramic phase and a metallic phase dispersed within the ceramic phase, the metallic phase comprising between about 0.1 vol % and about 15 vol % of the cermet electrolyte slurry and comprising at least one transition metal;
   coating at least one cathodic slurry onto the cermet electrolyte-coated anodic layer in a second slurry coating process to create at least one cathodic layer; and
   sintering the anodic layer, the cermet electrolyte slurry, and the at least one cathodic layer.

21. The method of claim 20, wherein:
- the anodic slurry comprises a ceramic material selected from a stabilized-zirconia, a doped ceria and mixtures thereof, and a metallic phase comprising at least one transition metal;
- the cermet electrolyte slurry comprises a ceramic phase selected from a stabilized-zirconia, a doped ceria and mixtures thereof; and
- the at least one cathodic slurry comprises a cathodic material selected from $LaSrMnO_3$, $LaSnFeO_3$, $(LaSr)(CoFe)O_3$, $LaCaMnO_3$, $(LaCa)(CoFe)O_3$, $La_{1-x}Sr_xMnO_3$ and $La_{1-x}Sn_xFeO_3$, wherein x ranges from 0.1 to 0.5.

22. The method of claim 21, wherein the at least one cathodic slurry further comprises a cathodic ceramic material selected from a stabilized-zirconia, a doped ceria and mixtures thereof.

23. The method of claim 21, wherein the ceramic material in the anodic slurry comprises a conventional-sized ceramic powder and a nano-sized ceramic powder, and the metallic phase of the anodic slurry comprises a conventional-sized metal powder and a nano-sized metal powder, and wherein the ceramic phase of the cermet electrolyte slurry comprises a nano-sized ceramic powder, and the metallic phase of the cermet electrolyte slurry comprises a nano-sized metal powder.

24. The method of claim 21, wherein the anodic slurry further comprises a pore forming material.

25. The method of claim 21, wherein the at least one transition metal is incorporated into the anodic slurry in oxide form, in salt form, or combinations thereof.

26. The method of claim 20, wherein the anodic layer is formed by an extruding, casting or pressing process.

27. The method of claim 20, wherein at least one of the anodic layer and the cathodic layer comprises a fuel cell performance enhancing interlayer adjacent the cermet electrolyte.

28. The method of claim 20 further comprising applying an anode current collector to the anodic layer and a cathode current collector to the at least one cathodic layer.

29. The method of claim 20 further comprising sintering the cermet electrolyte-coated anodic layer before the second slurry coating process.

30. The method of claim 20, wherein the at least one transition metal is incorporated into the cermet electrolyte slurry in oxide form, in salt form, or combinations thereof.

31. The method of claim 20, wherein the metallic phase of the cermet electrolyte slurry comprises particles of an oxide of the at least one transition metal dispersed within the ceramic phase.

32. The method of claim 20, wherein the metallic phase of the cermet electrolyte slurry comprises metal oxide particles having a particle size between about 0.1 micron and about 1.0 micron.

33. The method of claim 32, wherein the metal oxide particles are of equiaxed shape.

34. The method of claim 32, wherein the metal oxide particles are in a non-agglomerated state in the cermet electrolyte slurry.

35. The method of claim 20, wherein the cermet electrolyte slurry comprises a dispersant.

36. The method of claim 21, wherein the metallic phase of the cermet electrolyte slurry comprises a transition metal that is present in the metallic phase of the anodic slurry.

37. The method of claim 36, wherein the transition metal is Ni.

38. A solid oxide fuel cell comprising:
- an anodic layer,
- one or more cathodic layers, and
- an electrolytic layer disposed between the anodic layer and the one or more cathodic layers, wherein the electrolytic layer comprises an electrolytic cermet comprising a ceramic phase and a metallic phase dispersed within the ceramic phase, the metallic phase comprising between about 0.1 vol % and about 15 vol % of the electrolytic layer and comprising at least one transition metal, and wherein the electrolytic layer is in contact with a cathodic layer.

* * * * *